United States Patent
Park

(10) Patent No.: US 7,372,452 B2
(45) Date of Patent: May 13, 2008

(54) PORTABLE TERMINAL CAPABLE OF DISPLAYING DATA IN AN UPRIGHT DIRECTION REGARDLESS OF ROTATION OF SCREEN AND METHOD THEREFORE

(75) Inventor: Sung-Bok Park, Kyonggi-do (KR)

(73) Assignee: Samsung Electronics Co., Ltd (KR)

( * ) Notice: Subject to any disclaimer, the term of this patent is extended or adjusted under 35 U.S.C. 154(b) by 571 days.

(21) Appl. No.: 10/782,194

(22) Filed: Feb. 19, 2004

(65) Prior Publication Data

US 2004/0164958 A1 Aug. 26, 2004

(30) Foreign Application Priority Data

Feb. 26, 2003 (KR) .................. 10-2003-0011904

(51) Int. Cl.
G09G 5/08 (2006.01)
(52) U.S. Cl. .................. 345/158; 345/159; 345/163; 345/167
(58) Field of Classification Search ........ 345/156–158, 345/418–426, 163, 167, 8, 729, 781, 800, 345/649, 184; 700/83–85; 340/710, 709; 200/52 R; 455/566, 575.1, 552.1; 370/352; 353/69
See application file for complete search history.

(56) References Cited

U.S. PATENT DOCUMENTS

| | | | |
|---|---|---|---|
| 3,866,220 A * | 2/1975 | Embling et al. ............... 342/55 |
| 4,445,011 A * | 4/1984 | Hansen ..................... 200/52 R |
| 4,710,876 A * | 12/1987 | Cline et al. .................. 345/423 |
| 5,068,645 A * | 11/1991 | Drumm ...................... 345/184 |
| 5,602,569 A * | 2/1997 | Kato .......................... 345/158 |
| 5,627,949 A * | 5/1997 | Letcher, Jr. .................. 345/420 |
| 5,800,032 A * | 9/1998 | Uchiyama et al. ............ 353/69 |
| 6,198,941 B1* | 3/2001 | Aho et al. ................ 455/552.1 |
| 6,335,928 B1* | 1/2002 | Herrmann et al. .......... 370/352 |
| 6,445,364 B2* | 9/2002 | Zwern ............................ 345/8 |
| 6,505,088 B1* | 1/2003 | Simkin et al. ................ 700/85 |
| 6,720,949 B1* | 4/2004 | Pryor et al. .................. 345/158 |
| 6,952,601 B2* | 10/2005 | Lieu et al. ................ 455/575.1 |
| 7,164,432 B1* | 1/2007 | Amemiya .................... 345/649 |
| 2001/0048423 A1* | 12/2001 | Rekimoto .................... 345/157 |
| 2002/0075232 A1* | 6/2002 | Daum et al. ................. 345/158 |
| 2003/0122781 A1* | 7/2003 | Koo .............................. 345/158 |
| 2003/0157971 A1* | 8/2003 | Lieu et al. .................... 455/566 |

* cited by examiner

Primary Examiner—Prabodh Dharia
(74) Attorney, Agent, or Firm—The Farrell Law Firm, PC

(57) ABSTRACT

A portable terminal displays data received from the exterior or internally generated on its screen in an upright direction. The portable terminal includes a video processor, a display with the screen, a sensor, and a controller. The video processor converts data into a displayable format according to characteristics and size of the screen so the data can be displayed on the screen. The data displayed on the screen is converted according to the characteristics and size of the screen. The sensor has a sensing device for sensing rotation of the screen, and generates a sensing signal according to a rotating direction of the screen. The controller determines a rotating direction of the screen according to the sensing signal, and controls the video processor to convert a format of the data in an opposite direction of the determined rotating direction in order to display the data in an upright direction.

18 Claims, 17 Drawing Sheets

135

| SW #1 (53, 54) | SW #2 (63, 64) | SW #3 (51, 52) | SW #41 (61, 62) | ROT. DIRECTION (CLOCKWISE) |
|---|---|---|---|---|
| ON | OFF | OFF | OFF | DIRECTION #1 (0°) |
| OFF | ON | OFF | OFF | DIRECTION #2 (90°) |
| OFF | OFF | ON | OFF | DIRECTION #3 (180°) |
| OFF | OFF | OFF | ON | DIRECTION #4 (270°) |

FIG.7

| DIRECTION #1 (0°) | | |
| --- | --- | --- |
| COORDINATE POINT | BASIC COORDINATE VALUE (X,Y) | ROTATING COORDINATE VALUE (X,Y) |
| A | (0,0) | (0,0) |
| B | (0,$Y_1$) | (0,$Y_1$) |
| C | ($X_1$,$Y_1$) | ($X_1$,$Y_1$) |
| D | ($X_1$,0) | ($X_1$,0) |

FIG.9

| COORDINATE POINT | DIRECTION #2(90°) | |
|---|---|---|
| | BASIC COORDINATE VALUE (X,Y) | ROTATING COORDINATE VALUE (X,Y) |
| A | (0,0) | $(X_1,0)$ |
| B | $(0,Y_1)$ | (0,0) |
| C | $(X_1,Y_1)$ | $(0,Y_1)$ |
| D | $(X_1,0)$ | $(X_1,Y_1)$ |

FIG.11

| DIRECTION #3(180°) |||
|---|---|---|
| COORDINATE POINT | BASIC COORDINATE VALUE (X,Y) | ROTATING COORDINATE VALUE (X,Y) |
| A | (0,0) | $(X_1,Y_1)$ |
| B | $(0,Y_1)$ | $(X_1,0)$ |
| C | $(X_1,Y_1)$ | (0,0) |
| D | $(X_1,0)$ | $(0,Y_1)$ |

FIG.13

| COORDINATE POINT | DIRECTION #4(270°) | |
|---|---|---|
| | BASIC COORDINATE VALUE (X,Y) | ROTATING COORDINATE VALUE (X,Y) |
| A | (0,0) | (0,$Y_1$) |
| B | (0,$Y_1$) | ($X_1$,$Y_1$) |
| C | ($X_1$,$Y_1$) | ($X_1$,0) |
| D | ($X_1$,0) | (0,0) |

FIG.15 though the user wishes to see the data on a wide screen, can only see the information displayed on the LCD module in a normal direction, since width and length are fixed in accordance with the size of the standard screen. For example, if a display module of the portable terminal is rotated, e.g. by about 90° or 180°, the displayed data is also rotated by the same degree. Therefore, the user has a difficulty in seeing the displayed data.

PORTABLE TERMINAL CAPABLE OF DISPLAYING DATA IN AN UPRIGHT DIRECTION REGARDLESS OF ROTATION OF SCREEN AND METHOD THEREFORE

PRIORITY

This application claims priority under 35 U.S.C. § 119 to an application entitled "Portable Terminal Capable of Displaying Data in Upright Direction Regardless of Rotation of Screen and Method Therefor" filed in the Korean Industrial Property Office on Feb. 26, 2003 and assigned Ser. No. 2003-11904, the contents of which are incorporated herein by reference.

BACKGROUND OF THE INVENTION

1. Field of the Invention

The present invention relates generally to a display apparatus adopted to all kinds of portable communication terminals, including a cellular phone, a digital phone, a personal digital assistant (PDA), a hand-held phone and a notebook computer, and a data display method using the same, and in particular, to a portable terminal capable of displaying data considering a rotating direction of a display module, and a data displaying method using the same.

2. Description of the Related Art

In general, a portable terminal refers to a portable apparatus capable of providing a radio communication service to a user through radio communication with a base station. Such portable terminals have been generalized to people of all ages and both sexes all over the world, and are becoming necessities of life. The portable terminal essentially includes a mouthpiece/earpiece unit for exchanging audio signals with the other party, a data input/output unit, and an antenna device.

In the past, the portable terminal was simply used for a voice call. However, with the development of a communication technology, an improved portable terminal can transmit and receive text messages, and support a chatting function, a game function, etc. In addition, the improved portable terminal can access the Internet, and adopts a color LCD (Liquid Crystal Display) module instead of a black and white LCD module.

Typically, a microphone is used as a mouthpiece unit, and a speaker is used as an earpiece unit. In addition, keypad, touch screen and voice recognition device are used as data input units, and an LCD module is used as a data output unit.

A general LCD module displays input data so that a user can visually perceive the displayed data. The latest high-performance LCD module visually displays various data, such as text, graphics, animations, icons, still pictures and moving pictures, on its standardized screen, so that the user can perceive the displayed information.

However, the LCD modules that are utilized to provide screens for a portable terminal form screens having different widths and different lengths. Therefore, data and other information is displayed to a user on a standard size screen that is provided with a particular portable terminal model. In addition, the user, although he or she wishes to see the data on a wide screen, can only see the information displayed on the LCD module in a normal direction, since width and length are fixed in accordance with the size of the standard screen. For example, if a display module of the portable terminal is rotated, e.g. by about 90° or 180°, the displayed data is also rotated by the same degree. Therefore, the user has a difficulty in seeing the displayed data.

SUMMARY OF THE INVENTION

It is, therefore, an object of the present invention to provide a portable terminal capable of displaying data in an opposite direction of gravity (also referred to as an upright direction) regardless of rotation of a display module, and a data display method using the same.

It is another object of the present invention to provide a portable terminal capable of adjusting coordinate values of displayed data by sensing a rotating direction of a display module in order to display the data in an upright direction, and a data display method using the same.

A further object of the present invention is to provide a portable terminal capable of adjusting data according to the characteristics and size of a display module while displaying the data in an upright direction considering a rotating direction of the display module.

To achieve the above and other objects, there is provided a portable terminal for displaying data received from the exterior or internally generated on a standard size screen provided with the portable terminal. The portable terminal comprises a video processor for converting the data into a displayable format according to the characteristics and size of the screen so that the data can be displayed on the screen; a display with the screen, for displaying on the screen the data converted according to the characteristics and size of the screen; a sensor with a sensing device for sensing rotation of the screen, the sensor generating a sensing signal according to a rotating direction of the screen; and a controller for determining a rotating direction of the screen according to the sensing signal, and controlling the video processor to convert a format of the data in an opposite direction of the determined rotating direction in order to display the data in an upright direction.

Preferably, the sensor generates different sensing signals for first to fourth directions each representing rotating directions of the screen. Here, a rotation angle of the first direction is 0°, a rotation angle of the second direction is 90°, a rotation angle of the third direction is 180°, and a rotation angle of the fourth direction is 270°. Therefore, the controller determines any one of the first to fourth directions according to the sensing signal.

The portable terminal further comprises a memory for storing a lookup table based on which the controller determines a rotating direction of the screen according to the sensing signal. Further, the portable terminal comprises a key input module for selecting an automatic display mode for displaying the data in an upright direction regardless of a rotating direction of the screen, or a manual display mode for displaying the data in a normal direction regardless of a rotating direction of the screen. The controller orders the video processor to convert a format of the data in order to the data in an upright direction in the automatic display mode, and orders the video processor to output the data without converting a format of the data regardless of a rotating direction of the screen in the manual display mode.

The sensing device comprises a sensing body; a liquid guide chamber provided within the sensing body; a plurality of sensing terminals mounted along with the sensing body in such a way that the sensing terminals are exposed to inner and outer surfaces of the sensing body; and conductive liquid contained in the liquid guide chamber by a predetermined amount, the conductive liquid flowing in a direction of gravity to connect a particular sensing terminal to another sensing terminal. Thus, the controller determines a rotating direction of the screen depending on a sensing signal output from the sensing terminals connected by the conductive liquid.

Preferably, the sensing device further comprises at least one buffering chamber provided to one end of the sensing body, for buffering an abrupt change in the flow of the conductive liquid. Alternatively, the sensing device further comprises two spherical buffering chambers formed at both ends of the sensing body.

Preferably, the sensing terminals include a first sensing terminal mounted in a particular position of the sensing body; a second sensing terminal spaced apart from the first sensing terminal with the liquid guide chamber intervening therebetween; a third sensing terminal spaced apart from the first sensing terminal along with the sensing body; and a fourth sensing terminal spaced apart from the third sensing terminal with the liquid guide chamber intervening therebetween.

The sensing device includes a first direction sensing element mounted in a length direction of the screen and a second direction sensing element mounted in a width direction of the screen. The video processor converts a format of the data by converting coordinate values of the data according to a rotating direction of the screen under the control of the controller.

To achieve the above and other objects, there is provided a method for displaying data in a portable terminal with a screen for displaying the data. The method comprises the steps of: a) upon sensing rotation of the screen, generating a sensing signal; b) determining a rotating direction of the screen depending on the sensing signal; c) converting a format of the data in an opposite direction of the rotating direction of the screen; and d) displaying the format-converted data on the screen in an upright direction.

Preferably, the step a) comprises the step of generating different sensing signals for first to fourth directions each representing rotating directions of the screen. Here, a rotation angle of the first direction is 0°, a rotation angle of the second direction is 90°, a rotation angle of the third direction is 180°, and a rotation angle of the fourth direction is 270°. Thus, the step b) comprises the step of determining any one of the first to fourth directions according to the sensing signal.

The step b) comprises the step of determining a rotating direction of the screen according to the sensing signal based on a lookup table.

The method further comprises the step of selecting an automatic display mode for displaying the data in an upright direction regardless of a rotating direction of the screen, or a manual display mode for displaying the data in a normal direction regardless of a rotating direction of the screen.

The step c) comprises the step of converting a format of the data according to a rotating direction of the screen by converting coordinate values of the data.

According to the present invention, the proposed portable terminal calculates a rotating direction of a display module for displaying data, rotates the data in the opposite direction by an angle corresponding to the calculated rotating direction, and displays the rotated data on the display module. As a result, the data is always displayed in the upright direction regardless of rotation of the display module. In this manner, the present invention provides an improved convenient data display service to a user.

BRIEF DESCRIPTION OF THE DRAWINGS

The above and other objects, features and advantages of the present invention will become more apparent from the following detailed description when taken in conjunction with the accompanying drawings in which:

FIG. 7 is a lookup table describing the operation of the display module according to an embodiment of the present invention;

FIG. 9 is a lookup table illustrating rotating coordinate values of video data rotated by a video processor under the control of a controller while an LCD module is situated in a first direction, according to an embodiment of the present invention;

FIG. 11 is a lookup table illustrating rotating coordinate values of video data rotated by a video processor under the control of a controller while an LCD module is situated in a second direction, according to an embodiment of the present invention;

FIG. 13 is a lookup table illustrating rotating coordinate values of video data rotated by a video processor under the control of a controller while an LCD module is situated in a third direction, according to an embodiment of the present invention;

FIG. 15 is a lookup table illustrating rotating coordinate values of video data rotated by a video processor under the control of a controller while an LCD module is situated in a fourth direction, according to an embodiment of the present invention;

DETAILED DESCRIPTION OF THE PREFERRED EMBODIMENTS

Figure 1:
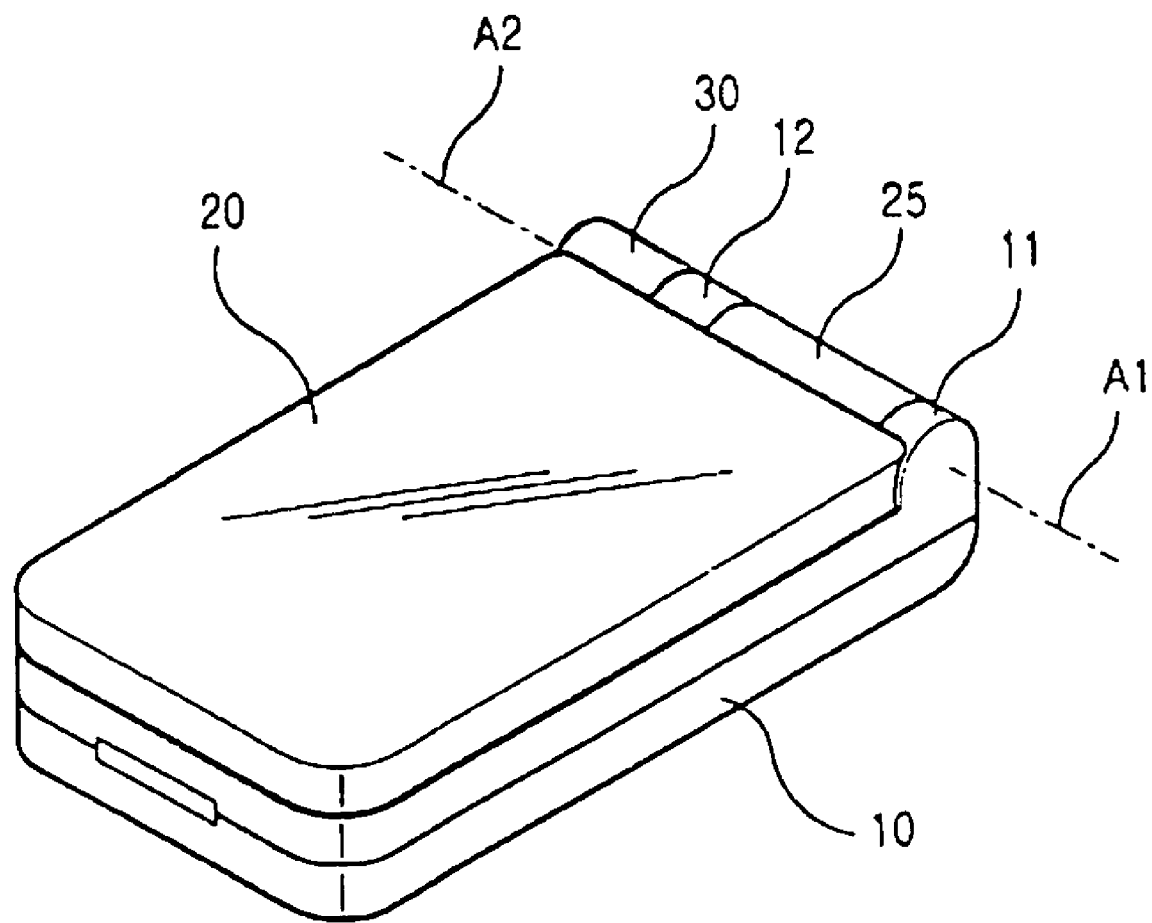
FIG. 1 is a perspective view illustrating a folder-type terminal with a sensing device according to an embodiment of the present invention, wherein a folder is folded.

Several preferred embodiments of the present invention will now be described in detail with reference to the annexed drawings. In the drawings, the same or similar elements are denoted by the same reference numerals even though they are depicted in different drawings. In the following description, a detailed description of known functions have been omitted for conciseness.

It should be noted that the present invention can be applied to all types of portable terminals, including a bar-type terminal, a flip-type terminal and a folder-type terminal. For the convenience of explanation, it will be assumed herein that the present invention is applied to the folder-type terminal. In a folder-type terminal illustrated in FIGS. 1 and 2, two housings are rotatably coupled to each other by a hinge device. Herein, the two housings include a main housing 10 and a folder 20. That is, in the known folder-type terminal, the main housing 10 is coupled to the folder 20 by the hinge device in such a manner that the folder 20 can be firmly folded or unfolded to/from the main housing 10. Preferably, the present invention can be applied to any one of the main housing 10 or the folder 20. Preferably, the present invention is applied to a position adjacent to an LCD module 22, which in the following embodiment is mounted on the folder 20, contributing to miniaturization of the housings.

Figure 2:
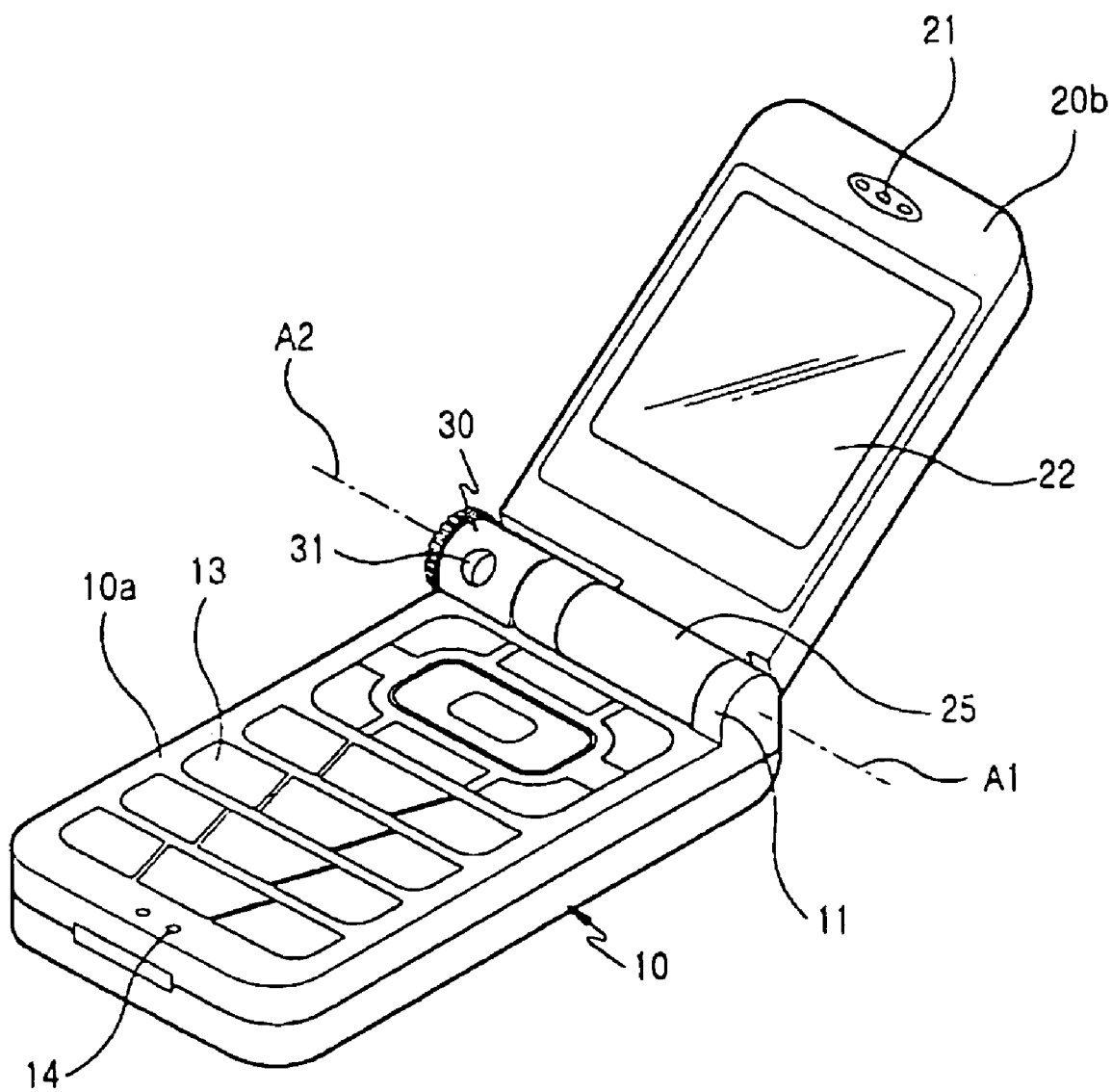
FIG. 2 is a perspective view illustrating a folder-type terminal with a sensing device according to an embodiment of the present invention, wherein the folder is unfolded.

Referring to FIGS. 1 and 2, the known folder-type terminal includes the main housing 10, the folder 20, the hinge device for rotatably coupling the folder 20 to the main housing 10, and a rotatable lens housing 30 mounted along with a first hinge axis A1 of the hinge device in such a way that the rotatable lens housing 30 faces a hinge arm 12.

The main housing 10 includes a keypad having a plurality of keys 13 arranged on its top surface 10a, and a microphone 14. The folder 20 includes a speaker 21 and an LCD module 22, both arranged on its inner surface 20b. When the main housing 10 and folder 20 are unfolded, as shown in FIG. 2, the speaker 21 and the microphone 14 are positioned at top and bottom positions, respectively, of the portable terminal.

The rotatable lens housing 30 includes a camera lens 31 and a CCD (Charge-Coupled Device) element (not shown) mounted therein. The camera lens 31 rotates about a second hinge axis A2 having the same axis as the first hinge axis A1.

The hinge device includes two hinge arms 11 and 12, and a center hinge arm 25 provided to the folder 20, rotatably coupled between the two hinge arms 11 and 12 by a hinge module (not shown). The reason that the hinge module is not illustrated is because it is installed within the center hinge arm 25.

Figure 3:
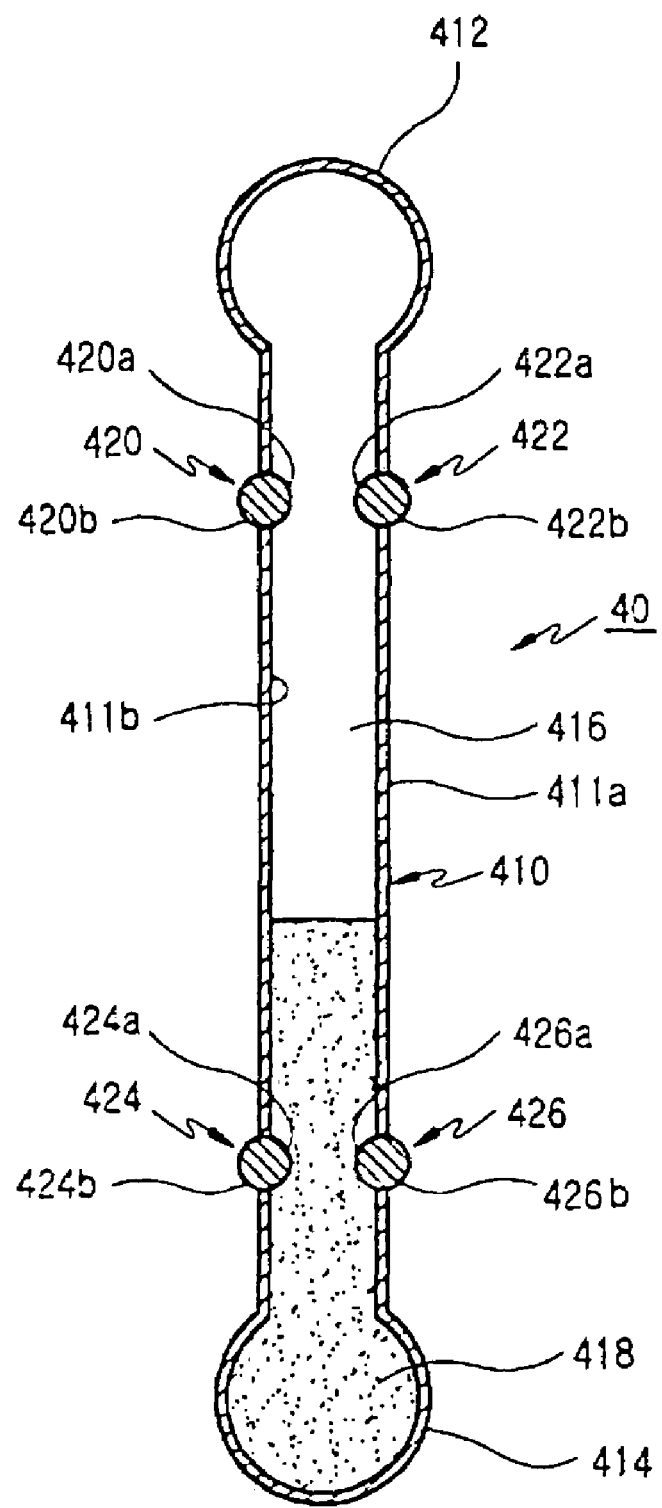
FIG. 3 is a cross-sectional view illustrating a structure of a sensing element for the sensing device, arranged in a top-to-bottom direction according to an embodiment of the present invention.

FIG. 3 is a cross-sectional view illustrating a structure of a sensing element 40 adopted to sense a rotating direction of the LCD module 22 according to an embodiment of the present invention. Referring to FIG. 3, the sensing element 40 can be mounted on either the main housing 10 or the folder 20, and the present invention adopts at least one sensing element. For example, one sensing element 40 can be mounted on any one of the main housing 10 and the folder 20. Alternatively, two sensing elements 40 can be mounted in a top-to-bottom direction and a transverse, i.e. side-to-side, direction, respectively.

In the case where only one sensing element 40 is mounted on the folder-type terminal in either the top-to-bottom direction or the transverse direction, the sensing element 40 generates a sensing signal for sensing two display screen states: a normal display screen state and an upside-down display screen state. In the case where two sensing elements 40 are mounted in transverse and top-to-bottom directions, the sensing elements 40 generate sensing signals for sensing four display screen states: a normal display screen state, an upside-down display screen state, a right-to-left reversed display screen state, and a right-to-left non-reversed display screen state.

Specifically, the sensing element 40 includes a rod-type sensing body 410, a liquid guide chamber 416 provided within the sensing body 410, and a plurality of sensing terminals 420, 422, 424 and 426, all provided to the sensing body 410 in such a way that they should be exposed to inner and outer surfaces 411b and 411a. Preferably, in order to absorb an abrupt change in movement of the liquid contained in the liquid guide chamber 416, buffering chambers 412 and 414 are provided to both ends of the sensing body 410. The buffering chambers 412 and 414 are spherical in shape, and can be provided to either one end or both ends of the sensing body 410.

A plurality of the sensing terminals 420, 422, 424 and 426 are provided to the sensing body 410. The sensing terminals, as stated above, are mounted in such a manner that they are exposed to the inner and outer surfaces 411b and 411a of the sensing body 410. This is to determine a display screen state according to the sensing signal generated by sensing a state of a screen displayed on the LCD module.

The sensing terminals include a first sensing terminal 420, a second sensing terminal 422 spaced apart from the first sensing terminal 420 with the liquid guide chamber 416 intervening therebetween, a third sensing terminal 424 spaced apart from the first sensing terminal 420 along a length of the sensing body 410, and a fourth sensing terminal 426 spaced apart from the third sensing terminal 424 with the liquid guide chamber 416 intervening therebetween. The first to fourth sensing terminals 420, 422, 424 and 426 each have inner connection terminals 420a, 422a, 424a and 426a, and outer connection terminals 420b, 422b, 424b and 426b, respectively.

The sensing body 410 has the liquid guide chamber 416 provided therein. The liquid guide chamber 416 serves to guide the flow of a conductive liquid 418 contained therein. Specifically, the liquid guide chamber 416 is provided to connect the first to fourth sensing terminals 420, 422, 424 and 426 to the liquid 418. The liquid 418 is conductive liquid. Preferably, the liquid 418 fills about 20-30% of the inner volume of the liquid guide chamber 416.

Shown in FIG. 3 is the sensing element 40 mounted in the top to bottom direction, relative to the folder and main body of the portable terminal. When the conductive liquid 418 is filled in the liquid guide chamber 416, the first and second sensing terminals 420 and 422 are electrically disconnected from each other, as they are spatially spaced apart from each other with the liquid guide chamber 416 interposed therebetween. However, the third and fourth sensing terminals 424 and 426 are electrically connected to each other, as the conductive liquid 418 fills a space therebetween. That is, the inner connection terminals 424a and 426a of the third and fourth sensing terminals 424 and 426 are electrically connected to each other by the conductive liquid 418.

Figure 4:
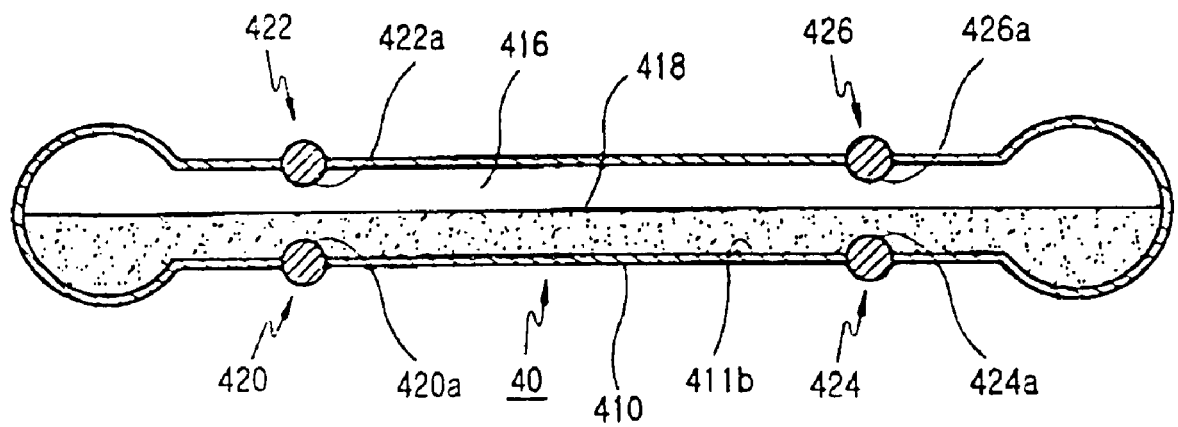
FIG. 4 is a cross-sectional view illustrating a structure of a sensing element for the sensing device, arranged in a transverse direction according to an embodiment of the present invention.

Illustrated in FIG. 4 is the sensing element 40 mounted in the horizontal direction. When the conductive liquid 418 flows within the liquid guide chamber 416 by gravity, the second and fourth sensing terminals are electrically disconnected from each other, as they are spaced apart from each other with the liquid guide chamber 416 intervening therebetween. However, the first and third sensing elements 420 and 424 are electrically connected to each other, as a space therebetween in the liquid guide chamber 416 is filled with the conductive liquid 418. That is, the inner connection terminals 420a and 424a of the first and third sensing terminals 420 and 424 are electrically connected to each other by the conductive liquid 418.

Preferably, the conductive liquid 418 filled in the liquid guide chamber 416 has a viscosity low enough to overcome surface tension of the inner surface 411b of the sensing body 410. As a result, the conductive liquid 418 can freely flow within the liquid guide chamber 416 according to gravity.

Figure 5:
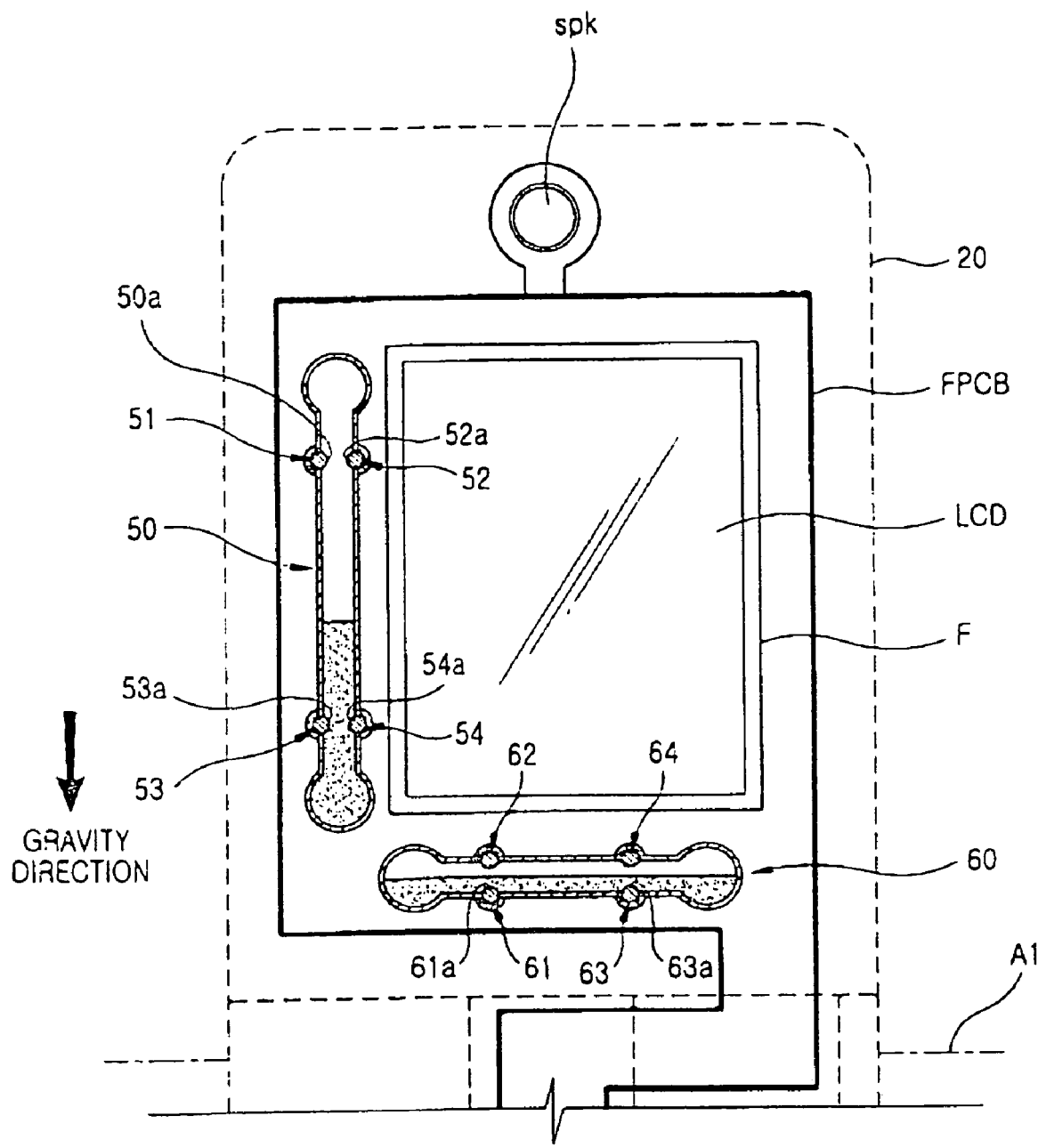
FIG. 5 is a cut-away cross-sectional view illustrating a folder on which a first direction sensing element and a second direction sensing element, constituting the sensing device for the portable terminal, are mounted according to an embodiment of the present invention.

FIG. 5 is a cross-sectional view illustrating a flexible printed circuit board (FPCB) on which first and second direction sensing elements 50 and 60 are mounted in top-to-bottom and transverse directions, respectively, according to an embodiment of the present invention. Referring to FIG. 5, the first direction sensing element 50 and the second direction sensing element 60 are mounted along a circumference of the LCD module in top-to-bottom direction and transverse directions, respectively. Preferably, those are mounted in the vicinity of a frame F of the LCD module. For reference, an arrow illustrated in FIG. 5 represents the direction of gravity (i.e. the direction opposite to the upright direction), and the FPCB is connected to a main board installed in the main housing 10 via the first hinge axis A1. A detailed structure of the first direction sensing element 50 and the second direction sensing element has already been described above.

The conductive liquid 418 contained in the first and second direction sensing elements 50 and 60 move in the gravity direction, and electrically connects the inner connection terminals of the first and second direction sensing elements 50 and 60. Specifically, the first direction sensing element 50 generates a sensing signal representing a state in which inner connection terminals 53a and 54a of its third and fourth sensing terminals 53 and 54 are electrically connected to each other by the conductive liquid, and the second direction sensing element 60 generates a sensing signal representing a state in which inner connection terminals 61a and 63a of its first and third sensing terminals 61 and 63 are electrically connected to each other by the conductive liquid. If the sensing signals are generated, a portable terminal according to the present invention determines a rotating direction of the LCD module according to the sensing signals, and then rotates data displayed on the LCD module in the opposite direction of the determined rotating direction. In FIG. 5, 'SPK' represents a speaker.

Summarizing, the portable terminal according to the present invention has first and second direction sensing elements 50 and 60 mounted in the vicinity of the LCD module, each element having four sensing terminals arranged therein, in order to determine a rotating direction of the LCD module according to the sensing signals sensed by the sensing elements and reverse data displayed on the LCD module of the screen when upside down or from right to left according to the rotating direction of the LCD module, thereby always displaying the data in an opposite direction of gravity, i.e. in the upright direction.

Now, a description will be made of a portable terminal capable of displaying data in an upright direction by using a sensing device proposed by the present invention, and a method therefore.

Figure 6:
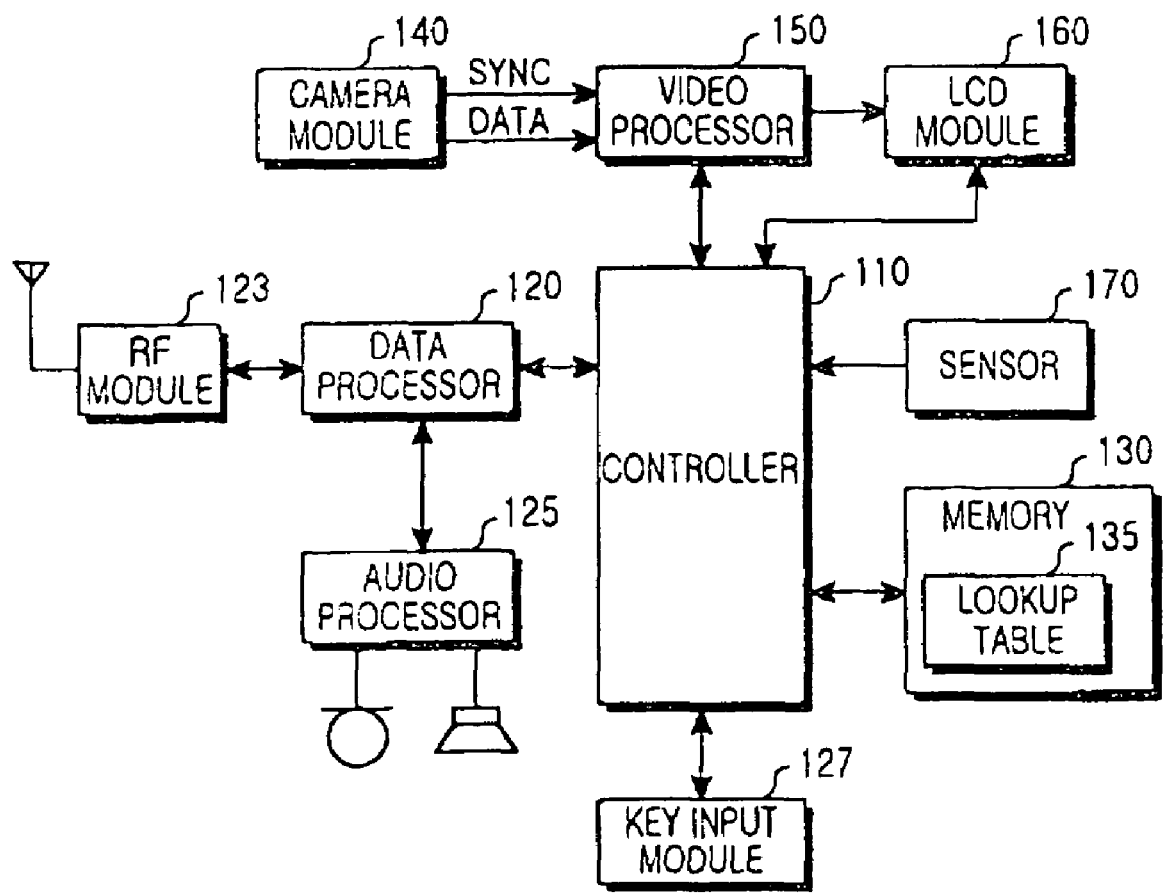
FIG. 6 is a block diagram illustrating a portable terminal with a sensing device for sensing a rotating direction of a display module according to an embodiment of the present invention.

FIG. 6 is a block diagram illustrating a portable terminal with a sensing device for sensing a rotating direction of a display module according to a preferred embodiment of the present invention. Referring to FIG. 6, an RF (Radio Frequency) module 123 manages a radio communication function of the portable terminal. The RF module 123 includes an RF transmitter for up-converting a frequency of a transmission signal and amplifying the up-converted transmission signal, and an RF receiver for low-noise-amplifying a received signal and down-converting a frequency of the amplified signal. A data processor 120 includes a modem for modulating a transmission signal provided to the RF module 123 and demodulating a reception signal provided from the RF module 123, and a codec for encoding a transmission signal provided to the RF module 123 and decoding a reception signal provided from the RF module 123. The codec includes a data codec for handling packet data, and an audio codec for handling an audio signal. An audio processor 125 reproduces an audio signal provided from the audio codec in the data processor 120, or delivers an audio signal picked up by a microphone to the audio codec in the data processor 120.

A key input module 127 includes a plurality of alphanumeric keys for inputting numeric and text information, and function keys for setting various functions. In addition, the key input module 127 may include a screen direction adjusting key for manually adjusting a display direction of data displayed on an LCD module 160 according to an embodiment of the present invention.

A memory 130 is comprised of a program memory and a data memory. The program memory stores a control program for controlling a general operation of the portable terminal, and a direction rotating program (hereinafter referred to as "pivot program") for adjusting a display direction of data displayed on the LCD module 160 according to an embodiment of the present invention. The data memory temporarily stores data generated during execution of the programs stored in the memory 130.

A controller 110 controls the overall operation of the portable terminal. The controller 110 may include the data processor 120. In operation, the controller 110 drives the pivot program stored in the memory 130 according to an embodiment of the present invention, in order to display data in an upright direction regardless of a direction of the LCD module 160 mounted on the portable terminal.

A camera module 140 takes a photograph of a subject through a lens. The camera module 140 includes a camera sensor for converting an optical images signal of the subject into an electric signal, and a signal processor for converting an analog video signal provided from the camera sensor into digital data. It will be assumed herein that a CCD sensor is used as the camera sensor and the signal processor is realized with a digital signal processor (DSP). The camera sensor and the signal processor can be combined into one body, or realized separately.

A video processor 150 generates display data for displaying a video signal provided from the camera module 140. The video processor 150 handles a video signal output from the camera module 140 by the frame, and adjusts the video frame data according to characteristic (or possible resolution) and size of the LCD module 160. The video processor 150, having a video codec, compresses video frame data to be displayed on the LCD module 160 according to a predetermined compression technique, or restores the compressed video frame data to its original video frame data. For the video codec, JPEG (Joint Photographic Expert Group) codec, MPEG4 (Moving Picture Experts Group 4) codec or Wavelet codec can be used. The video processor 150 is assumed to have an OSD (On-Screen Display) function, and combines video data with OSD data under the control of the controller 110.

The LCD module 160 displays on its screen the video data output from the video processor 150 and user data output from the controller 110. The LCD module 160 can separately include an LCD controller, a memory for storing video data, and an LCD display element. The LCD module 160, if it is realized with a touch screen, can also serve as a data input unit.

The portable terminal according to the present invention has a sensor 170 for sensing a direction of the LCD module 160. The sensor 170 provides the controller 110 with a sensing signal that is sensed through separately connected lines according to a direction of the LCD module 160. The controller 110 then determines a direction of the LCD module 160 by analyzing the sensing signal provided from the sensor 170. Here, the direction of the LCD module 160 can be represented by a rotation angle of the LCD module 160 on the basis of the upright direction of the LCD module 160. The rotation angle can be subdivided according to a direction of the LCD module 160. However, in this embodiment, the rotation angle is divided into four angles of 0°, 90°, 180° and 270°, for simplicity of description.

Preferably, the memory 130 includes a lookup table 135 in which rotating directions of the LCD module 160 are matched to associated sensing signals provided from the sensor 170. As a result, upon receiving a sensing signal from the sensor 170, the controller 110 detects an associated rotating direction of the LCD module 160 from the lookup table 135 stored in the memory 135.

After detecting the rotating direction of the LCD module 160, the controller 110 orders the video processor 150 to rotate video data in an opposite direction of the detected rotating direction of the LCD module 160. The video processor 150 then rotates the video data under the control of the controller 110. Preferably, the video processor 150 adjusts a size of the video data according to the size and characteristics of a display area of the LCD module 160.

In sum, the portable terminal calculates a rotation angle of the LCD module 160 and rotates video data displayed on the LCD module 160 in the opposite direction by the calculated rotation angle. As a result, the video data is always displayed in the upright direction regardless of rotation of the LCD module 160.

FIG. 7 is a lookup table 135 describing the operation of the display module shown in block diagram format in FIG. 6. For the sake of convenience, it is assumed in FIG. 7 that the third and fourth sensing terminals 53 and 54 of the first direction sensing element 50 of FIG. 5 are referred to as "first switch," the third and fourth sensing terminals 63 and 64 of the second direction sensing element 60 as "second switch," the first and second sensing terminals 51 and 52 of the first direction sensing element 50 as "third switch," and the first and second sensing terminals 61 and 62 of the second direction sensing element 60 as "fourth switch". In addition, a rotation angle of the LCD module 160 is divided into 0°, 90°, 180° and 270° in a clockwise direction. For the sake of convenience, it is assumed that a direction of the LCD module 160 rotated clockwise by 0° is referred to as "first direction," a direction of the LCD module 160 rotated clockwise by 90° as "second direction," a direction of the LCD module 160 rotated clockwise by 180° as "third direction," and a direction of the LCD module 160 rotated clockwise by 270° as "fourth direction".

Referring to FIGS. 6 and 7, the controller 110 detects a rotation angle of the LCD module 160 from the lookup table 135 according to a sensing signal provided from the sensor 170. If the sensing signal indicates that the first switch is turned ON by the conductive liquid and the other switches are turned OFF, the controller 110 determines that a rotating direction of the LCD module 160 is equal to the first direction. If the sensing signal indicates that the second switch is turned ON and the other switches are turned OFF, the controller 110 determines that a rotating direction of the LCD module 160 is equal to the second direction. If the sensing signal indicates that the third switch is turned ON and the other switches are turned OFF, the controller 110 determines that a rotating direction of the LCD module 160 is equal to the third direction. If the sensing signal indicates that the fourth switch is turned ON and the other switches are turned OFF, the controller 110 determines that a rotating direction of the LCD module 160 is equal to the fourth direction.

As a result, the controller 110 orders the video processor 150 to rotate video data to be displayed on the LCD module 160 in an opposite direction of the rotating direction of the LCD module 160. The video processor 150 then rotates the video data under the control of the controller 110, and adjusts the rotated video data according to characteristic and display area of the LCD module 160.

Figure 8:
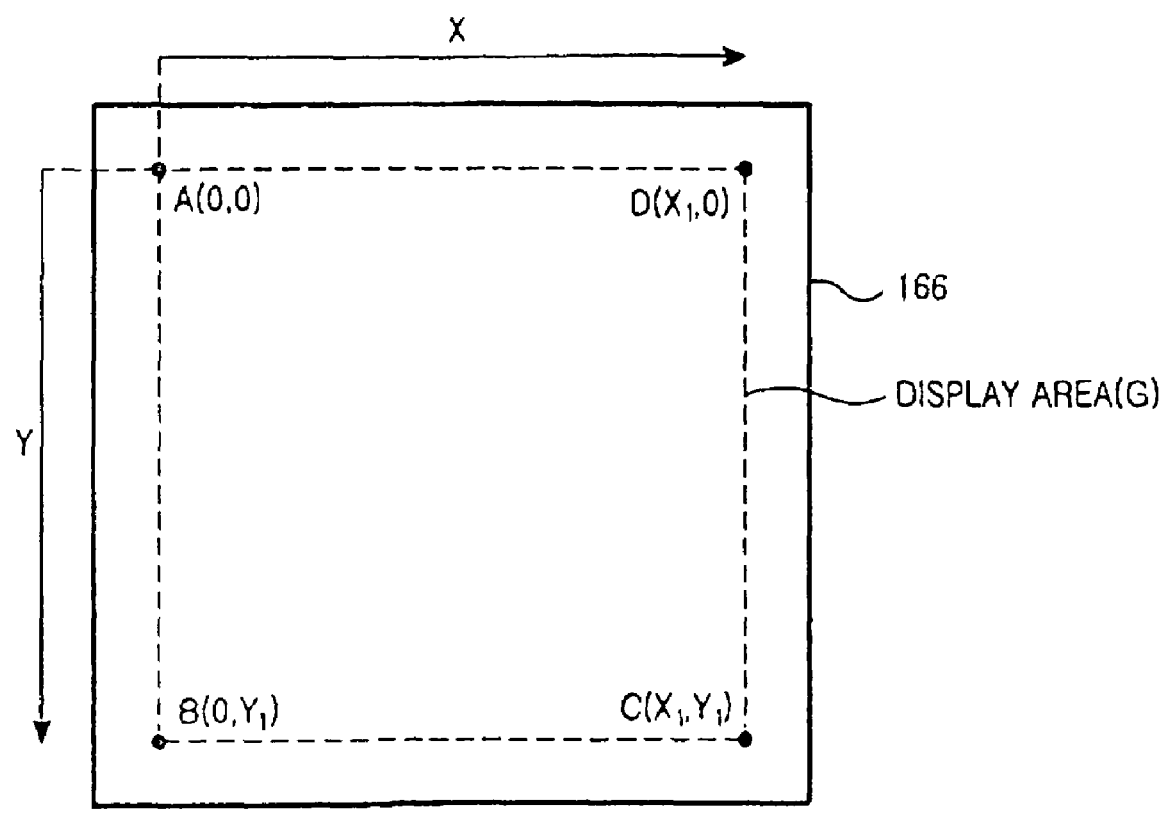
FIG. 8 schematically illustrates an external structure of the LCD module according to an embodiment of the present invention.

FIG. 8 schematically illustrates an external structure of the LCD module 160 shown in FIG. 6. Specifically, FIG. 8 schematically illustrates the exterior of the LCD module 160 on the basis of an area where video data is displayed. The exterior of the LCD module 160 is divided into an LCD frame 166, and a display area G, prepared in the LCD frame 166, for displaying video data. The video data is displayed on the whole or a part of the display area G. The display area G can be defined by different coordinate values determined by the pixel by a horizontal, i.e. transverse, (X) axis and a vertical, i.e. top-to-bottom, (Y) axis. The LCD frame 166 is arranged in the same direction as that of the LCD module 160. In the drawing, the LCD frame 166 arranged in the first direction. A description of the present invention will be made on the basis of edges (or corners) of the display area G.

In the drawing, among the edge values of the display area G, a coordinate value of a coordinate point A, an origin of both the X and Y axes, is represented by (0,0), a coordinate value of a coordinate point B with the maximum Y-axis coordinate value is represented by $(0,Y_1)$, a coordinate value of a coordinate point C with the maximum X and Y-axis coordinate values is represented by $(X_1,Y_1)$, and a coordinate value of a coordinate point D with the maximum X-axis coordinate value is represented by $(X_1,0)$. In this embodiment, coordinate values of the coordinate points A, B, C and D on the display area G situated in the first direction will be defined as "basic coordinate values."

FIG. 9 illustrates rotating coordinate values of video data rotated by the video processor 150 under the control of the controller 110 in the case where the LCD module 160 is situated in the first direction, according to an embodiment of the present invention. As illustrated, if the LCD module 160 is rotated in the first direction (i.e., if the LCD module 160 is not rotated), the video processor 150 does not rotate the video data, maintaining the basic coordinate values (X,Y).

Figure 10A:
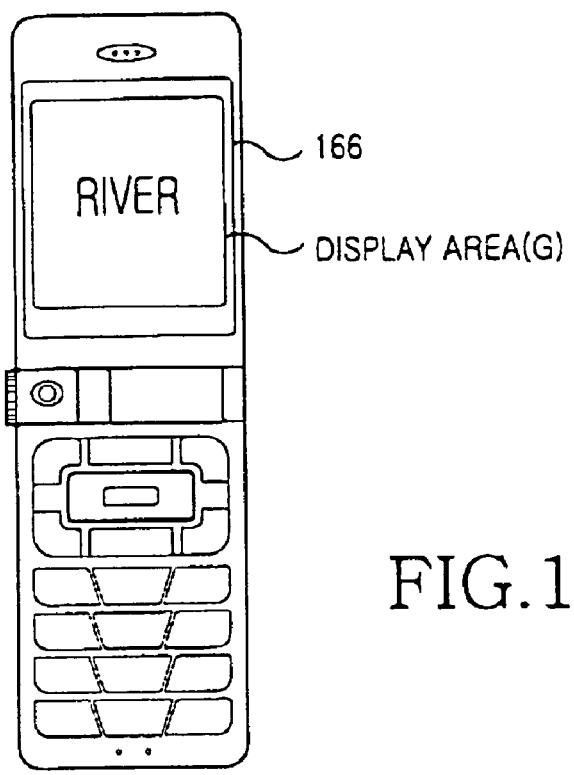
FIGS. 10A and 10B illustrate a display state of video data and a positional state of the sensing device in the case where the LCD module is situated in the first direction (0°)
Figure 10B:
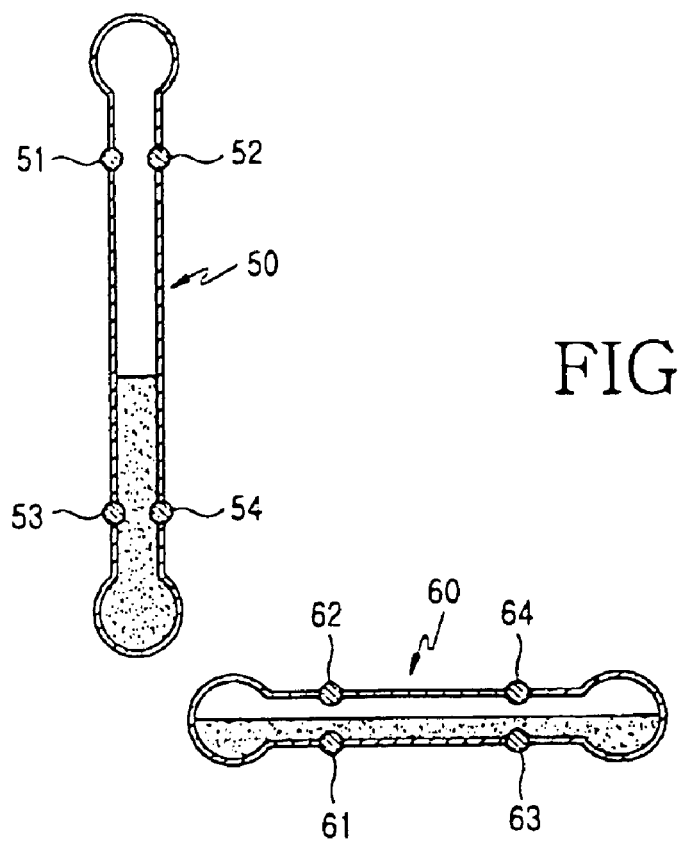

FIGS. 10A and 10B illustrate a display state of video data and a positional state of the sensing device in the case where the LCD module 160 is situated in the first direction (0°) as described in conjunction with FIG. 9. As illustrated, the video data "RIVER" is displayed in the upright direction within the display area G of the LCD frame 166. In this case, the first switch (53 and 54) of the sensing device is turned ON.

FIG. 11 illustrates rotating coordinate values of video data rotated by the video processor 150 under the control of the controller 110 in the case where the LCD module 160 is situated in the second direction, according to an embodiment of the present invention. As illustrated, if the LCD module 160 is rotated in the second direction (i.e., if the LCD module 160 is rotated clockwise by 90°), the video processor 150 rotates the video data counterclockwise by 90°. That is, the video processor 150 converts the basic coordinate value (0,0) of the coordinate point A to a rotating coordinate value $(X_1,0)$, and converts the basic coordinate value $(0,Y_1)$ of the coordinate point B to a rotating coordinate value (0,0). Further, the video processor 150 converts the basic coordinate value $(X_1,Y_1)$ of the coordinate point C to a rotating coordinate value $(0,Y_1)$, and converts the basic coordinate value $(X_1,0)$ of the coordinate point D to a rotating coordinate value $(X_1,Y_1)$. The video processor 150 provides the video data having the converted coordinate values to the LCD module 160, and the LCD module 160 displays the provided video data in the upright direction.

Figure 12A:
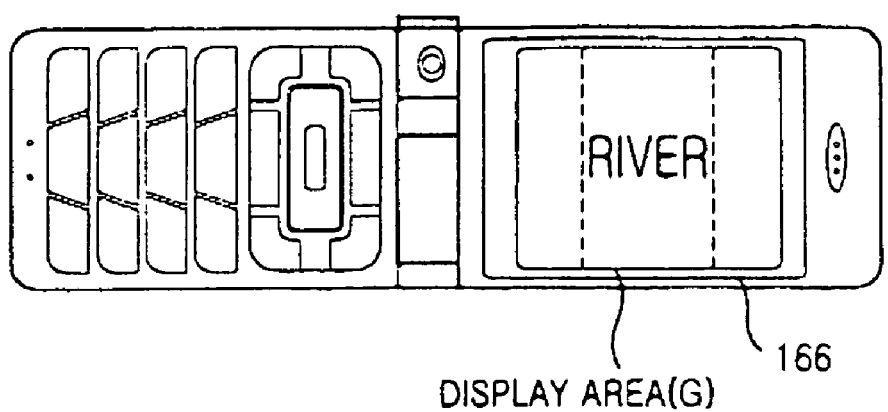
FIGS. 12A and 12B illustrate a display state of video data and a positional state of the sensing device in the case where the LCD module is situated in the second direction (90°)
Figure 12B:
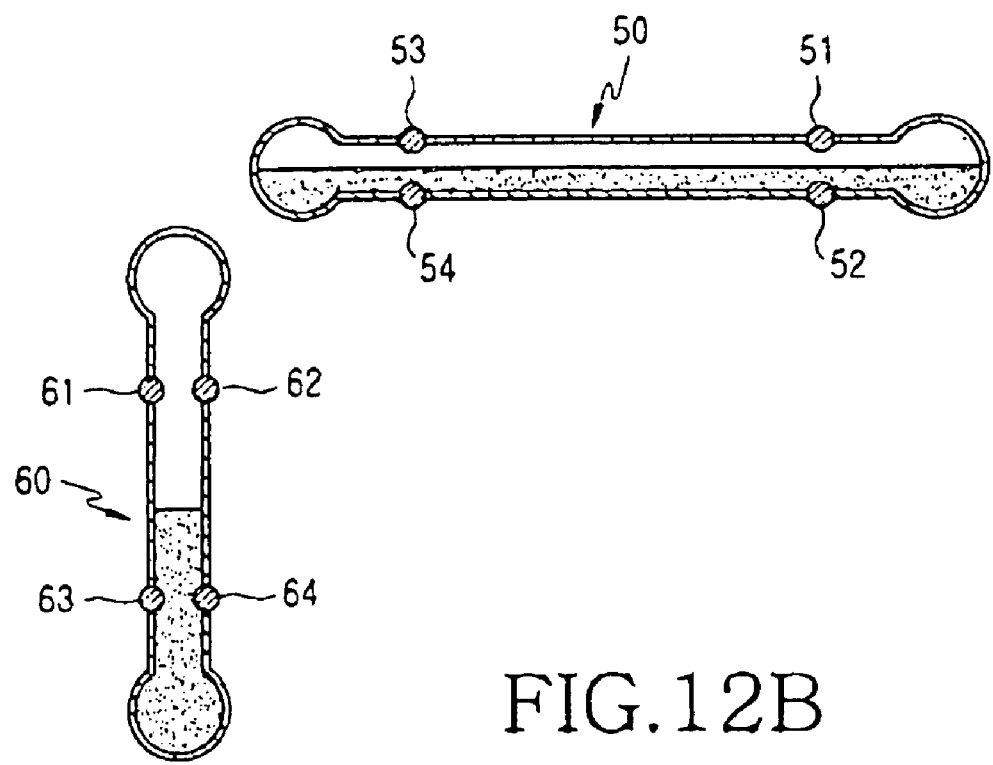

FIGS. 12A and 12B illustrate a display state of video data and a positional state of the sensing device in the case where the LCD module 160 is situated in the second direction (90°) as described in conjunction with FIG. 11. As illustrated, the video data "RIVER," coordinate values of which are converted as it is rotated counterclockwise by 90° by the video signal processor 150 on the basis of the LCD module 160 situated in the second direction, is displayed in the upright direction within the display area G of the LCD frame 166. In the case where the LCD module 160 is rotated clockwise by about 90° from the first direction, the second switch comprised of the third and fourth sensing terminals 63 and 64 of the second direction sensing element 60 is turned ON by the conductive liquid. Then, the controller 110 determines a rotating direction of the LCD module 160 according to a sensing signal provided from the sensing device and adjusts coordinate values of the video data according to the determination.

FIG. 13 illustrates rotating coordinate values of video data rotated by the video processor 150 under the control of the controller 110 in the case where the LCD module 160 is situated in the third direction, according to an embodiment of the present invention. As illustrated, if the LCD module 160 is rotated in the third direction (i.e., if the LCD module 160 is rotated clockwise by 180°), the video processor 150 rotates the video data counterclockwise by 180°. That is, the video processor 150 converts the basic coordinate value (0,0) of the coordinate point A to a rotating coordinate value $(X_1,Y_1)$, and converts the basic coordinate value $(0,Y_1)$ of the coordinate point B to a rotating coordinate value $(X_1,0)$. Further, the video processor 150 converts the basic coordinate value $(X_1,Y_1)$ of the coordinate point C to a rotating coordinate value (0,0), and converts the basic coordinate value $(X_1,0)$ of the coordinate point D to a rotating coordinate value $(0,Y_1)$. The video processor 150 provides the video data having the converted coordinate values to the LCD module 160, and the LCD module 160 displays the provided video data in the upright direction.

Figure 14A:
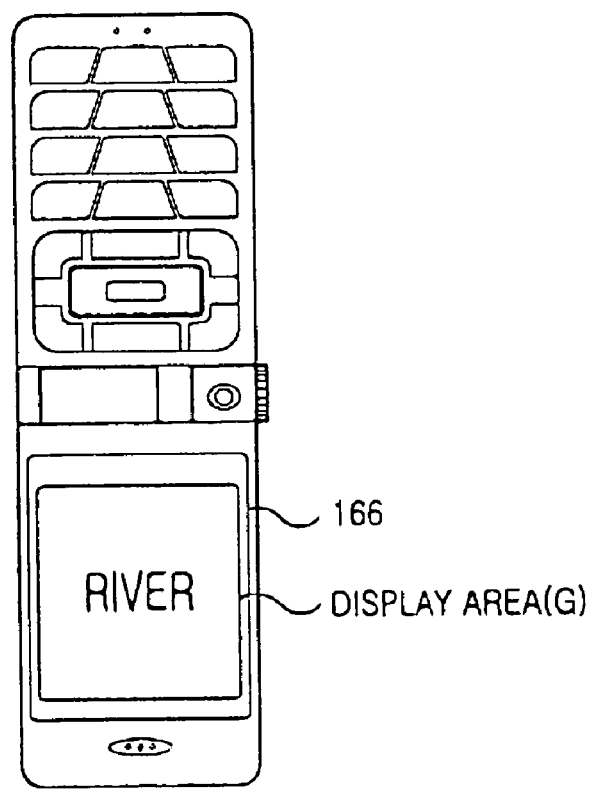
FIGS. 14A and 14B illustrate a display state of video data and a positional state of the sensing device in the case where the LCD module is situated in the third direction (180°)
Figure 14B:
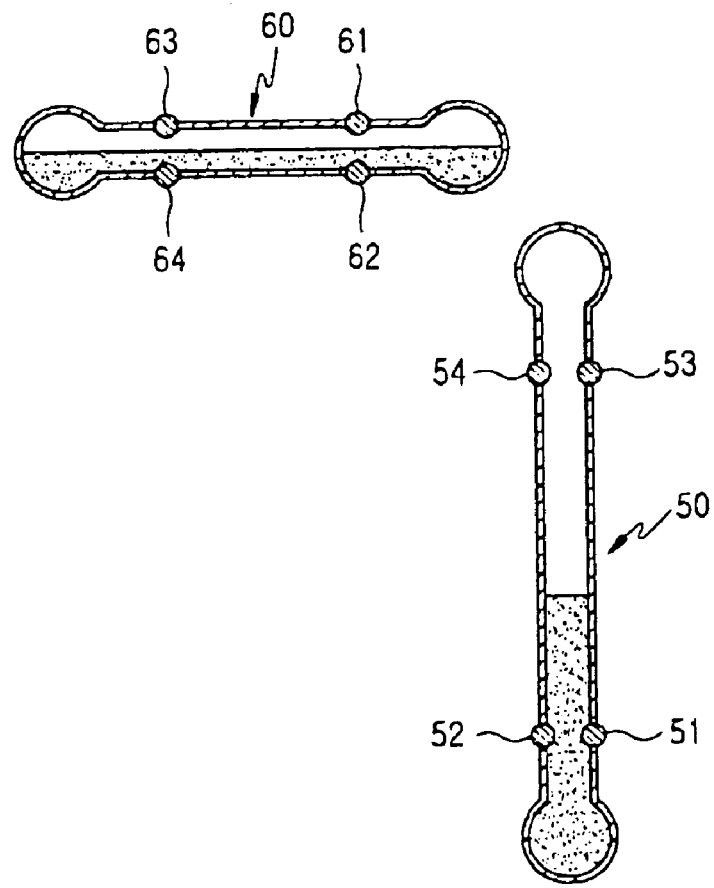

FIGS. 14A and 14B illustrate a display state of video data and a positional state of the sensing device in the case where the LCD module 160 is situated in the third direction (180°) as described in conjunction with FIG. 13. As illustrated, the video data "RIVER," coordinate values of which are converted as it is rotated counterclockwise by 180° by the video signal processor 150 on the basis of the LCD module 160 situated in the third direction, is displayed in the upright direction within the display area G of the LCD frame 166. In the case where the LCD module 160 is rotated clockwise by about 90° from the second direction, the third switch comprised of the first and second sensing terminals 51 and 52 of the first direction sensing element 50 is turned ON by the conductive liquid. Then, the controller 110 determines a rotating direction of the LCD module 160 according to a sensing signal provided from the sensing device and adjusts coordinate values of the video data according to the determination.

FIG. 15 illustrates rotating coordinate values of video data rotated by the video processor 150 under the control of the controller 110 in the case where the LCD module 160 is situated in the fourth direction, according to an embodiment of the present invention. As illustrated, if the LCD module 160 is rotated in the fourth direction (i.e., if the LCD module 160 is rotated clockwise by 270°), the video processor 150 rotates the video data counterclockwise by 270° or rotates the video data clockwise by 90°. That is, the video processor 150 converts the basic coordinate value (0,0) of the coordinate point A to a rotating coordinate value $(0,Y_1)$, and converts the basic coordinate value $(0,Y_1)$ of the coordinate point B to a rotating coordinate value $(X_1,Y_1)$. Further, the video processor 150 converts the basic coordinate value $(X_1,Y_1)$ of the coordinate point C to a rotating coordinate value $(X_1,0)$, and converts the basic coordinate value $(X_1,0)$ of the coordinate point D to a rotating coordinate value (0,0). The video processor 150 provides the video data having the converted coordinate values to the LCD module 160, and the LCD module 160 displays the provided video data in the upright direction.

Figure 16A:
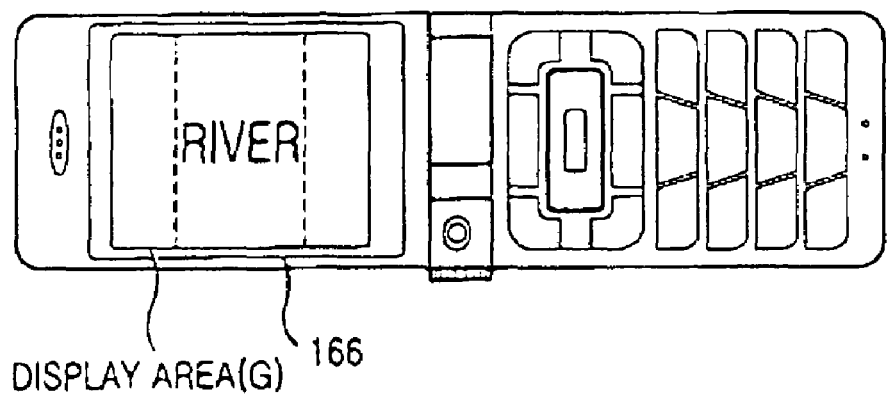
FIGS. 16A and 16B illustrate a display state of video data and a positional state of the sensing device in the case where the LCD module is situated in the fourth direction (270°)
Figure 16B:
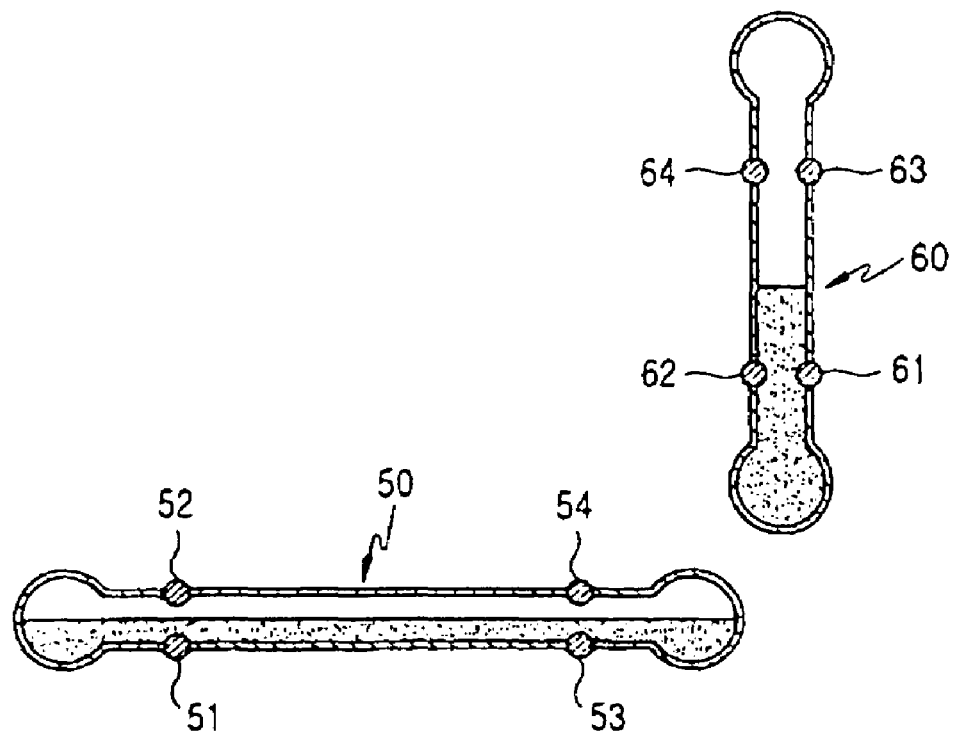

FIGS. 16A and 16B illustrate a display state of video data and a positional state of the sensing device in the case where the LCD module 160 is situated in the fourth direction (270°) as described in conjunction with FIG. 15. As illustrated, the video data "RIVER," coordinate values of which are converted as it is rotated either counterclockwise by 270° or clockwise by 90° by the video signal processor 150 on the basis of the LCD module 160 situated in the fourth direction, is displayed in the upright direction within the display area G of the LCD frame 166. In the case where the LCD module 160 is rotated clockwise by about 90° from the third direction, the fourth switch comprised of the first and second sensing terminals 61 and 62 of the second direction sensing element 60 is turned ON by the conductive liquid. Then, the controller 110 determines a rotating direction of the LCD module 160 according to a sensing signal provided from the sensing device and adjusts coordinate values of the video data according to the determination.

In addition, the portable terminal proposed by the present invention can optionally perform an automatic display mode and a manual display mode according to a control command. The automatic display mode is defined to automatically display video data in the upright direction regardless of rotation of the LCD module 160. The manual display mode is defined to always display video data in the normal direction, or the first direction (0°), without converting coordinate values of the video data, regardless of a rotating direction of the LCD module 160.

In an alternative embodiment where a single sensing element is used, the portable terminal determines a rotating direction of the LCD module 160 by detecting a conduction state between sensing terminals of the sensing element, and converts a format of the video data according to the determination so as to display the screen in the upright direction. Referring to FIG. 3, a conduction state between the first and second sensing terminals 420 and 422, a conduction state between the second and fourth sensing terminals 422 and 426, a conduction state between the third and fourth sensing terminals 424 and 426, and a conduction state between the first and third sensing terminals 420 and 424 are stored in the lookup table 135 of FIG. 6 in order to detect a rotating direction of the LCD module 160. The other structures and operations are similar to those described in conjunction with the case where two sensing elements are used.

Figure 17:
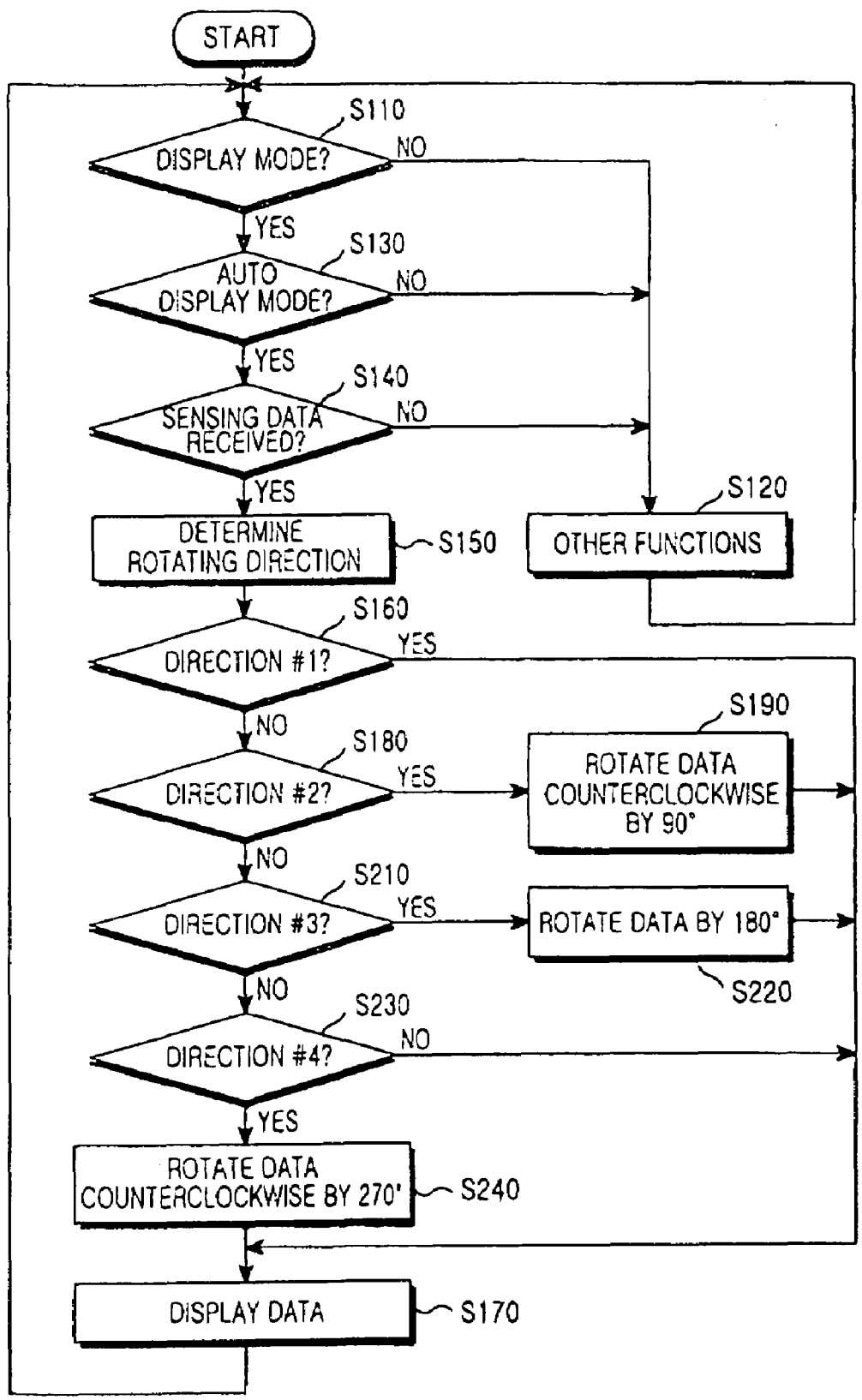
FIG. 17 is a flowchart illustrating a method for displaying video data in a portable terminal according to a preferred embodiment of the present invention.

FIG. 17 is a flowchart illustrating a method for displaying video data in a portable terminal according to a preferred embodiment of the present invention. Referring to FIG. 17, the controller 110 determines whether an operation mode of the portable terminal includes a display mode for displaying video data on the LCD module 160 (Step S110). Here, the "display mode" refers to an operation mode in which video data is displayed on the LCD module as the folder 20 is unfolded against the body housing 10. If it is determined that the operation mode of the portable terminal does not include the display mode, the controller 110 performs other functions in operation (Step S120).

Otherwise, if it is determined that the operation mode of the portable terminal includes the display mode, the controller 110 determines whether the display mode is an automatic display mode for adjusting video data considering a rotation angle of the LCD module 160 thereby to display the video data in an upright direction (Step 130). If it is determined that the display mode is not the automatic display mode, the controller 110 orders the video processor 150 to display the video data in the normal direction, or the first direction, without rotating the video data.

If, however, the display mode is the automatic display mode, the controller 110 determines whether sensing data, or a sensing signal, is received from the sensor 170 (Step S140). If it is determined that a sensing signal is not received, the controller 110 orders the video processor 150 to display the video data in the first direction without rotating the video data. Otherwise, if it is determined that a sensing signal is received from the sensor 170, the controller 110 determines which switch is providing the sensing signal, in order to detect a rotation angle of the LCD module 160 (Step S150). In this case, the controller 110 determines a rotating direction of the LCD module 160 by checking conduction states (or switching states) of the first to fourth switches based on the lookup table 135.

In this way, the controller 110 determines whether a rotating direction of the LCD module 160 is a first direction (Step S160). If it is determined that the rotating direction of the LCD module 160 is the first direction, the controller 110 orders the video processor 150 to output video data without rotating. The LCD module 160 then displays the video data on the display area G (Step S170).

If it is determined in step S160 that the rotating direction of the LCD module 160 is not the first direction, the controller 110 determines whether the rotating direction of the LCD module 160 is a second direction (Step S180). If it is determined that the rotating direction of the LCD module 160 is the second direction, the controller 110 orders the video processor 150 to rotate video data counterclockwise by 90° (Step S190). As a result, the video data rotated by 90° by the video processor 150 is displayed on the LCD module 160 in the upright direction (Step S170).

If it is determined in step S180 that the rotating direction of the LCD module 160 is not the second direction, the controller 110 determines whether the rotating direction of the LCD module 160 is a third direction (Step S210). If it is determined that the rotating direction of the LCD module 160 is the third direction, the controller 110 orders the video processor 150 to rotate video data by 180° (Step S220). As a result, the video data rotated by 180° by the video processor 150 is displayed on the LCD module 160 in the upright direction (Step S170).

If it is determined in step S210 that the rotating direction of the LCD module 160 is not the third direction, the controller 110 determines whether the rotating direction of the LCD module 160 is a fourth direction (Step S230). If it is determined that the rotating direction of the LCD module 160 is not the fourth direction, the controller 110 orders the video processor 150 to output video data without rotation. Therefore, the video data is displayed on the LCD module 160 in the first direction.

Otherwise, if it is determined that the rotating direction of the LCD module 160 is the fourth direction, the controller 110 orders the video processor 150 to rotate video data counterclockwise by 270° or clockwise by 90° (Step S240). As a result, the video data rotated counterclockwise by 270° or rotated clockwise by 90° is displayed on the LCD module 160 in the upright direction (Step S170).

According to the present invention, the proposed portable terminal calculates a rotating direction of a display module for displaying data, rotates the data in the opposite direction by an angle corresponding to the calculated rotating direction, and displays the rotated data on the display module. As a result, the data is always displayed in the upright direction regardless of rotation of the display module. In this manner, the present invention provides an improved convenient data display service to a user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable terminal for displaying data on a screen, the portable terminal comprising:
   a video processor for converting the data into a displayable format according to characteristics and size of the screen so that the data can be displayed on the screen;
   a sensing device for sensing rotation of the screen, the sensing device generating a sensing signal according to a rotating direction of the screen; and
   a controller for determining the rotating direction of the screen according to the sensing signal, and controlling the video processor to convert a format of the data in an opposite direction of the determined rotating direction by converting coordinate values of the data in order to display the data in an upright direction.

2. The portable terminal of claim 1, wherein the sensing device generates different sensing signals for first to fourth directions, each representing rotating directions of the screen.

3. The portable terminal of claim 2, wherein a rotation angle of the first direction is 0°, a rotation angle of the second direction is 90°, a rotation angle of the third direction is 180°, and a rotation angle of the fourth direction is 270°.

4. The portable terminal of claim 3, wherein the controller determines one of the first to fourth directions to be the rotation angle according to the sensing signal.

5. The portable terminal of claim 4, further comprising a memory for storing a lookup table of coordinate values, wherein the coordinate values are based on predetermined rotating directions of the screen and corresponding to different sensing signals for each of first to fourth directions.

6. The portable terminal of claim 5, further comprising a key input module for selecting an automatic display mode for displaying the data in the upright direction regardless of the rotating direction of the screen, or a manual display mode for displaying the data in a normal direction regardless of the rotating direction of the screen;
wherein the controller accesses the coordinate values of the lookup table and orders the video processor to convert the displayable format of the data to display the data in an upright direction when in the automatic display mode; and the controller orders the video processor to output the data without converting the format of the data regardless of the rotating direction of the screen when in the manual display mode.

7. The portable terminal of claim 1, wherein the sensing device comprises:
a sensing body;
a liquid guide chamber provided within the sensing body;
a plurality of sensing terminals mounted on the sensing body, wherein the sensing terminals are exposed to an inner surface of the sensing body; and
conductive liquid contained in the liquid guide chamber by a predetermined amount, wherein when the portable terminal is rotated, the conductive liquid flows in a direction of gravity to connect a particular sensing terminal to another sensing terminal thereby creating a conductive path for generating the sensing signal;
wherein the controller determines a rotating direction of the screen depending on the sensing signal output from the sensing terminals connected by the conductive liquid.

8. The portable terminal of claim 7, wherein the sensing device further comprises at least one buffering chamber provided to an end of the sensing body, for buffering an abrupt change in the flow of the conductive liquid.

9. The portable terminal of claim 7, wherein the sensing device further comprises two spherical buffering chambers formed at opposite ends of the sensing body.

10. The portable terminal of claim 7, wherein the plurality of sensing terminals comprise:
a first sensing terminal mounted in a particular position of the sensing body;
a second sensing terminal spaced apart from the first sensing terminal with the liquid guide chamber intervening therebetween;
a third sensing terminal spaced apart from the first sensing terminal along a length of the sensing body; and
a fourth sensing terminal spaced apart from the third sensing terminal with the liquid guide chamber intervening therebetween.

11. The portable terminal of claim 1, wherein the sensing device includes a first direction sensing element mounted in a top-to bottom direction and a second direction sensing element mounted in a transverse direction of the screen.

12. The portable terminal of claim 5, wherein the video processor converts the displayable format of the data by converting coordinate values of the lookup table according to a rotating direction of the screen under the control of the controller.

13. A method for displaying data in a portable terminal with a screen for displaying the data, the method comprising the steps of:
a) generating a sensing signal upon rotation of the screen;
b) determining a rotating direction of the screen depending on the sensing signal;
c) converting a format of the data in an opposite direction of the rotating direction of the screen by converting coordinate values of the data; and
d) displaying the format-converted data on the screen in an upright direction.

14. The method of claim 13, wherein step a) further comprises generating different sensing signals for first to fourth directions, each representing rotating directions of the screen.

15. The method of claim 14, wherein a rotation angle of the first direction is 0°, a rotation angle of the second direction is 90°, a rotation angle of the third direction is 180°, and a rotation angle of the fourth direction is 270°.

16. The method of claim 15, wherein step b) further comprises determining any one of the first to fourth directions to be the rotating direction according to the sensing signal.

17. The method of claim 16, wherein step b) further comprises determining a rotating direction of the screen according to the sensing signal based on a lookup table.

18. The method of claim 17, further comprising selecting an automatic display mode for displaying the data in the upright direction regardless of the rotating direction of the screen, or a manual display mode for displaying the data in a normal direction regardless of the rotating direction of the screen.

* * * * *